United States Patent
Shudo et al.

(10) Patent No.: US 10,851,242 B2
(45) Date of Patent: Dec. 1, 2020

(54) ADDITION-CURABLE SILICONE RUBBER COMPOSITION AND SILICONE RUBBER

(71) Applicant: SHIN-ETSU CHEMICAL CO., LTD., Tokyo (JP)

(72) Inventors: Shigeki Shudo, Annaka (JP); Nobu Kato, Annaka (JP); Hidenori Mizushima, Annaka (JP); Shigeru Ubukata, Annaka (JP); Noriyuki Meguriya, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 71 days.

(21) Appl. No.: 15/778,754

(22) PCT Filed: Nov. 29, 2016

(86) PCT No.: PCT/JP2016/085354
§ 371 (c)(1),
(2) Date: May 24, 2018

(87) PCT Pub. No.: WO2017/098961
PCT Pub. Date: Jun. 15, 2017

(65) Prior Publication Data
US 2018/0346722 A1 Dec. 6, 2018

(30) Foreign Application Priority Data
Dec. 10, 2015 (JP) ................. 2015-240773

(51) Int. Cl.
| | |
|---|---|
| C08L 83/04 | (2006.01) |
| C08K 5/5419 | (2006.01) |
| C08L 83/06 | (2006.01) |
| C08K 3/36 | (2006.01) |
| C08K 5/54 | (2006.01) |
| C08K 9/06 | (2006.01) |

(52) U.S. Cl.
CPC ............. *C08L 83/04* (2013.01); *C08K 3/36* (2013.01); *C08K 5/54* (2013.01); *C08K 5/5419* (2013.01); *C08K 9/06* (2013.01); *C08L 83/06* (2013.01); *C08L 2205/025* (2013.01)

(58) Field of Classification Search
CPC ........ C08G 77/12; C08G 77/20; C08G 77/70; C07F 7/0836; C08L 83/00
See application file for complete search history.

(56) References Cited

U.S. PATENT DOCUMENTS

| | | | |
|---|---|---|---|
| 5,145,931 A | 9/1992 | Nakayoshi et al. | |
| 5,597,853 A | 1/1997 | Itoh et al. | |
| 6,348,557 B1 * | 2/2002 | Barthel | ............... C08G 77/045 524/730 |
| 2003/0232202 A1 | 12/2003 | Yaginuma et al. | |
| 2008/0249244 A1 | 10/2008 | Meguriya et al. | |
| 2009/0082527 A1 | 3/2009 | Ikeno et al. | |

FOREIGN PATENT DOCUMENTS

| | | |
|---|---|---|
| EP | 1 978 060 A1 | 10/2008 |
| EP | 2 042 559 A1 | 4/2009 |
| JP | 3-157474 A | 7/1991 |
| JP | 4-311764 A | 11/1992 |
| JP | 5-28738 B2 | 4/1993 |
| JP | 6-54405 B2 | 7/1994 |
| JP | 7-228782 A | 8/1995 |
| JP | 11-514667 A | 12/1999 |
| JP | 2008-255227 A | 10/2008 |
| JP | 2009-91547 A | 4/2009 |
| WO | WO 97/49767 A1 | 12/1997 |
| WO | WO 2016/132690 A1 | 8/2016 |

OTHER PUBLICATIONS

Freeman (Silicones, Published for the Plastics Institute, ILIFFE Books Ltd, 1962, pp. 26-27).*
Extended European Search Report for European Application No. 16872861.6, dated Jun. 5, 2019.
International Search Report, issued in PCT/JP2016/085354, dated Jan. 17, 2017.
Written Opinion of the International Searching Authority, issued in PCT/JP2016/085354, dated Jan. 17, 2017.

* cited by examiner

*Primary Examiner* — Kuo Liang Peng
(74) *Attorney, Agent, or Firm* — Birch, Stewart, Kolasch & Birch, LLP

(57) ABSTRACT

An addition-curable silicone rubber composition which contains: 100 parts by weight of (A) an organopolysiloxane that is represented by average composition formula (1) $R^1_a SiO_{(4-a)/2}$ (wherein $R^1$ represent monovalent hydrocarbon groups that are the same as or different from each other, and a represents a positive number of 1.5-2.8) and has at least two alkenyl groups, each of which is bonded to a silicon atom, in each molecule; 0.3-20 parts by weight of (B) an organohydrogen polysiloxane that has at least two hydrogen atoms (SiH functional groups), each of which is bonded to a silicon atom, in each molecule; 5-80 parts by weight of (C) a reinforcing silica; and (D) an addition reaction catalyst, which is configured of a platinum group metal, in an amount of 0.5-1,000 ppm relative to the total weight of the components (A) and (B). This addition-curable silicone rubber composition also contains (E) an organopolysiloxane, which has one or more Si—OH functional groups in each molecule, while having a polymerization degree of 10 or less, in an amount of 0.005-0.3% by weight relative to the total weight of the composition.

13 Claims, No Drawings

ADDITION-CURABLE SILICONE RUBBER COMPOSITION AND SILICONE RUBBER

TECHNICAL FIELD

This invention relates to an addition-curable silicone rubber composition having a minimized content of reactive volatile siloxane compounds, specifically volatile siloxane compounds containing silicon-bonded OH functional groups (or silanol groups), and a silicone rubber.

BACKGROUND ART

Silicone rubbers are widely used in a variety of fields while taking advantage of their heat resistance, freeze resistance, and electric properties. It is known in the art that since siloxane polymers for forming silicone rubbers are prepared through equilibration reaction of siloxane oligomers with the aid of acid or alkali, they always contain, independent of whether the degree of polymerization (DOP), i.e., the number of silicon atoms per molecule is high or low, considerable amounts of cyclic siloxanes having a DOP of up to 20, called low-molecular-weight siloxanes, and being free of reactive groups such as SiH and alkenyl functional groups in the molecule, called non-functional siloxanes. As also known in the art, the low-molecular-weight siloxanes will volatilize from the cured rubber not only in high temperature atmosphere, but also slightly in room temperature conditions and deposit on the surroundings, giving rise to various problems such as haze or turbidity evolution, adhesion interference, and hydrophobic surface. While the low-molecular-weight siloxanes may be substantially reduced by post-curing the cured rubber at high temperature, the rubber which is used in a sealed state or as a part to be combined with a less heat resistant resin has the problem of prohibited exposure to high temperature. While the low-molecular-weight siloxanes may be removed by volatilization at high temperature under reduced pressure, complete removal is difficult, with some siloxanes being left at a level around 1% by weight or a lower level of about 0.5% by weight (about 5,000 ppm).

In this connection, for example, JP-A H03-157474 (Patent Document 1) discloses an addition reaction-curable silicone rubber adhesive in which the content of low-molecular-weight siloxanes having a vapor pressure of at least 10 mmHg at 200° C. is up to 500 ppm, and JP-B H06-054405 (Patent Document 2) describes a fixing roller in which the content of low-molecular-weight siloxanes having a DOP of 20 or less is up to 0.75% by weight. Also JP-A H04-311764 (Patent Document 3) discloses a method for preparing a siloxane polymer having a low content of low-molecular-weight siloxanes through the chain extending step using a polymer having SiH functional groups at both ends of the molecular chain.

However, even when the content of low-molecular-weight siloxanes is reduced, the above problems are left and another problem arises that low-molecular-weight siloxanes which have volatilized from the cured product and deposited on the surrounding members cannot be readily removed by such operation as wiping with solvent.

JP-A 2008-255227 (Patent Document 4) discusses unique problems of low-molecular-weight siloxanes having a hydrogen atom directly bonded to a silicon atom (or SiH functional group) and discloses a composition having a reduced content of low-molecular-weight siloxanes.

Patent Document 1: JP-A H03-157474
Patent Document 2: JP-B H06-054405
Patent Document 3: JP-A H04-311764
Patent Document 4: JP-A 2008-255227

SUMMARY OF INVENTION

Technical Problem

An object of the invention, which has been made under the above-mentioned circumstances, is to provide an addition-curable silicone rubber composition which cures into a cured product or silicone rubber from which low-molecular-weight siloxane components will volatilize only a little, which eliminates problems such as haze or turbidity evolution, adhesion interference, and hydrophobic surface caused by deposition of the volatilized low-molecular-weight siloxanes on the surroundings, and may find safe use as infant goods such as bottle teats and baby dummies, kitchen goods such as cake molds, gaskets for water plumbing, and medical and health care tools such as dialyzers, and a silicone rubber.

Solution to Problem

Making extensive investigations to attain the above object, the inventors have found that silicone rubbers contain as the low-molecular-weight siloxane components, a low-molecular-weight siloxane having a Si—OH group (or silanol group) besides the non-functional low-molecular-weight siloxane component and the low-molecular-weight cyclic siloxane component having a reactive group such as a SiH functional group in the molecule.

In general, the non-functional low-molecular-weight cyclic siloxanes are contained in non-functional polymers and vinyl functional polymers whereas the SiH-bearing low-molecular-weight cyclic siloxanes are contained in SiH functional polymers serving as crosslinker.

On the other hand, silanol-bearing siloxanes are not contained in these polymers or if any, contained in minimal amounts which do not give rise to any problems. However, reinforcing silica is essential in order to produce silicone rubbers from silicone polymers. Without the reinforcing silica, the resulting rubbers have very low physical strength, i.e., low tensile strength and low elongation. The reinforcing silica, independent of whether it is fumed silica or precipitated silica, is hydrophilic because of numerous silanol groups on the surface. It is then very difficult to mix the reinforcing silica with a hydrophobic silicone polymer and stabilize the mixed state. For this reason, the reinforcing silica typically needs to be chemically treated with a substance, called wetter or surface treating agent, in powder form or during mixing with the silicone polymer. Since this substance should be reactive with silanol groups on the silica, it must have functional groups.

Silanes such as alkylalkoxysilanes, alkylsilanols (or alkylhydroxysilanes), alkylchlorosilanes, alkylsilazanes, silane coupling agents and oligomers thereof are known as the relevant substance. However, they contain silanol-bearing silanes or siloxanes, or form silanol-containing substances during reaction by decomposition, recombination or the like. In some cases, chainlike or cyclic short-chain polysiloxanes (i.e., silicone polymers) may be used instead of these functional silanes. In order that the short-chain polysiloxane can react with silica, high temperature and/or decomposition catalyst must be used, causing to form silanol-containing silanes or siloxanes as well.

Like the non-functional low-molecular-weight siloxanes and SiH functional low-molecular-weight siloxanes, such silanol-containing silanes and siloxanes may volatilize and deposit on the surroundings, raising the problems such as haze or turbidity evolution, contact fault, adhesion interference, and hydrophobic surface. Furthermore, as compared with the non-functional and SiH functional low-molecular-weight siloxanes, the silanol-containing silanes and siloxanes exhibit high hydrophilicity due to silanol groups. This suggests the danger that the silanol-containing silanes and siloxanes are readily extracted with highly hydrophilic liquids such as water and alcohols. For example, in the application such as bottle teats and baby dummies, there is a strong possibility that they are extracted in saliva and absorbed by infants. From kitchen goods, they may be extracted in various cooking water base liquids such as soups. There is the increased possibility of extraction from gaskets for faucets into water, from medical-related parts into body fluids such as blood, and from health care-related parts into water base liquids such as sweat.

However, in the cited documents pertaining to low-molecular-weight siloxanes, only non-functional cyclic or linear siloxanes (e.g., dimethylpolysiloxane) and SiH functional group-bearing low-molecular-weight siloxanes are described whereas silanol-containing low-molecular-weight siloxanes are referred to nowhere.

Making further investigations, the inventors have found that since reinforcing silica for imparting strength to the cured rubber and a surface treating agent for enabling to blend the silica in a silicone polymer are essential to an addition reaction-curable silicone rubber composition, and silanol-containing low-molecular-weight silanes and siloxanes remaining in the composition are unavoidable, it is critical for solving the outstanding problems to control the amount of these silanes and siloxanes below a specific level.

Specifically, regarding the addition-curable silicone rubber composition, the inventors have found that when not only the content of non-functional and SiH functional low-molecular-weight siloxanes having a DOP of up to 10 is reduced, but also the content of Si—OH functional low-molecular-weight silanes and siloxanes having a DOP of up to 10 is reduced to or below 0.3% by weight based on the total composition, various problems such as contact fault, adhesion interference, and turbid appearance on the surroundings of the cured product due to volatilization of low-molecular-weight siloxanes as well as the risk of absorbing the Si—OH functional low-molecular-weight siloxanes into the human body directly from baby dummies and medical tools or via foods and tap water can be mitigated. The invention is predicated on this finding.

Accordingly, the invention provides an addition-curable silicone rubber composition and a silicone rubber, as defined below.

[1] An addition-curable silicone rubber composition comprising:

(A) 100 parts by weight of an organopolysiloxane having at least two silicon-bonded alkenyl groups per molecule, represented by the average compositional formula (1):

$$R^1_a SiO_{(4-a)/2} \quad (1)$$

wherein $R^1$ which may be the same or different is a monovalent hydrocarbon group and a is a positive number of 1.5 to 2.8, (B) 0.3 to 20 parts by weight of an organohydrogenpolysiloxane having at least two silicon-bonded hydrogen atoms (SiH functional groups) per molecule, (C) 5 to 80 parts by weight of reinforcing silica, and (D) an addition reaction catalyst in an amount to give 0.5 to 1,000 ppm of platinum group metal based on the total weight of components (A) and (B), wherein (E) an organopolysiloxane containing at least one Si—OH functional group per molecule and having a degree of polymerization of up to 10 is present in a content of 0.005 to 0.3% by weight based on the total weight of the composition.

[2] The silicone rubber composition of [1] wherein a molar ratio of SiH functional groups in component (B) to silicon-bonded alkenyl groups in component (A), that is, SiH/alkenyl ratio is in a range of 0.6/1 to 3.0/1.

[3] The silicone rubber composition of [1] or [2] wherein the reinforcing silica as component (C) is silica which is hydrophobically surface treated with at least one surface treating agent selected from organosilane and organosilazane compounds.

[4] The silicone rubber composition of [3] wherein the surface treating agent is hexamethyldisilazane.

[5] The silicone rubber composition of any one of [1] to [4] wherein component (E) is at least one organopolysiloxane selected from those of structures having the following formulae (2) to (4):

wherein k is an integer of 0 to 3, m is an integer of 0 to 9, n is an integer of 1 to 10, M is $(CH_3)_3SiO_{1/2}$—, Q is $SiO_{4/2}$, and D is —$(CH_3)_2SiO_{2/2}$—.

[6] The silicone rubber composition of any one of [1] to [5] wherein (F) an organopolysiloxane free of a functional group in the molecule and having a degree of polymerization of up to 10 is present in a content of up to 0.3% by weight based on component (A).

[7] The silicone rubber composition of any one of [1] to [6] wherein (G) an organopolysiloxane free of a Si—OH functional group in the molecule, containing at least one SiH functional group per molecule and having a degree of polymerization of up to 10 is present in a content of up to 10.0% by weight based on component (B).

[8] The silicone rubber composition of any one of [1] to [7] wherein component (B) is an organohydrogenpolysiloxane of linear, cyclic, branched or three-dimensional network structure, having a degree of polymerization of at least 11.

[9] The silicone rubber composition of [8] wherein component (B) is a linear organohydrogenpolysiloxane having the following formula (5):

[Chem. 1]

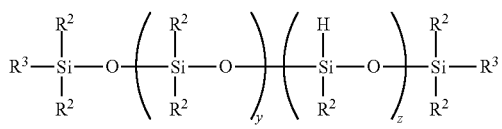

(5)

wherein y is an integer of 1 to 98, z is an integer of 2 to 50, y+z is an integer of 9 to 100, $R^2$ which may be the same or different is a substituted or unsubstituted, $C_1$-$C_{10}$ monovalent hydrocarbon group, and $R^3$ is each independently $R^2$ or hydrogen.

[10] The silicone rubber composition of any one of [1] to [9] wherein components (F) and (G) are present in a total content of up to 0.3% by weight based on the total weight of the composition.
[11] A silicone rubber which is a cured product of the silicone rubber composition of any one of [1] to [10].
[12] The silicone rubber of [11] wherein component (E) is present in a content of 0.005 to 0.3% by weight in the cured product of the silicone rubber composition.
[13] The silicone rubber of [12] wherein components (F) and (G) are present in a total content of up to 0.3% by weight in the cured product of the silicone rubber composition.
[14] The silicone rubber of [11], [12] or [13] wherein the silicone rubber composition is primarily cured (cured in mold) into a product which shows a weight loss of up to 0.5% by weight upon heating at 200° C. for 4 hours according to the BfR recommendations.

Advantageous Effects of Invention

The composition of the invention affords a cured product which may find safe use in various applications because low-molecular-weight siloxane components will volatilize only a little from the cured product, and the cured product eliminates such problems as haze or turbidity evolution, adhesion interference, and hydrophobic surface resulting from the volatilized low-molecular-weight siloxanes depositing on the surroundings.

DESCRIPTION OF EMBODIMENTS

Component (A), which is a main component (i.e., base polymer) of the composition, is an organopolysiloxane containing on average at least two alkenyl groups per molecule. An alkenyl-containing organopolysiloxane of structure having the average compositional formula (1) is preferably used. As used herein, the average value of alkenyl groups per molecule refers a number average value of alkenyl groups per molecule which is computed from the number average molecular weight (or number average degree of polymerization) measured by gel permeation chromatography (GPC) versus polystyrene standards.

$$R^1_a SiO_{(4-a)/2} \tag{1}$$

Herein $R^1$ which may be the same or different is a substituted or unsubstituted monovalent hydrocarbon group of 1 to 10 carbon atoms, preferably 1 to 8 carbon atoms, and "a" is a positive number of 1.5 to 2.8, preferably 1.8 to 2.5, and more preferably 1.95 to 2.05.

Examples of the silicon-bonded substituted or unsubstituted monovalent hydrocarbon group represented by $R^1$ include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl, and naphthyl; aralkyl groups such as benzyl, phenylethyl, and phenylpropyl; alkenyl groups such as vinyl, allyl, propenyl, isopropenyl, butenyl, hexenyl, cyclohexenyl, and octenyl; and substituted forms of the foregoing groups in which some or all hydrogen atoms are substituted by halogen atoms (e.g., fluorine, bromine and chlorine), cyano or the like, such as chloromethyl, chloropropyl, bromoethyl, trifluoropropyl, and cyanoethyl. It is preferred that at least 90% of entire $R^1$ groups be methyl.

Of $R^1$ groups in the molecule, at least two must be alkenyl groups, preferably of 2 to 8 carbon atoms, more preferably of 2 to 6 carbon atoms, and most preferably vinyl. The content of alkenyl groups is preferably $5.0 \times 10^{-6}$ to $5.0 \times 10^{-3}$ mol/g, more preferably $1.0 \times 10^{-5}$ to $1.0 \times 10^{-3}$ mol/g of the organopolysiloxane. If the alkenyl content is less than $5.0 \times 10^{-6}$ mol/g, then rubber hardness may be too low to provide a satisfactory seal. An alkenyl content in excess of $5.0 \times 10^{-3}$ mol/g may give an extremely high crosslinking density, resulting in brittle rubber. The alkenyl group may be bonded to the silicon atom at the end of the molecular chain and/or a silicon atom midway the molecular chain.

The structure of the organopolysiloxane is typically a linear structure whose backbone is composed basically of repeating diorganosiloxane units and which is capped at either end of the molecular chain with a triorganosiloxy group although a branched or cyclic structure may be partially included. The molecular weight of the organopolysiloxane is not particularly limited and the invention covers from liquid organopolysiloxanes having a low viscosity (typically a viscosity at 25° C. of the order of 100 to 1,000,000 mPa·s, preferably 300 to 500,000 mPa·s, and more preferably 1,000 to 100,000 mPa·s as measured by a rotational viscometer or the like) to gum-like (or substantially non-flowing at room temperature (25° C.)) organopolysiloxanes having a high viscosity (typically a viscosity at 25° C. of the order of more than 1,000,000 mPa·s, specifically 2,000,000 to 10,000,000 mPa·s (average DOP 3,000 to 10,000), or higher viscosity (higher DOP)). As used herein, the term "average DOP" refers to a number average degree of polymerization measured by GPC versus polystyrene standards.

Further preferably, in the alkenyl-containing organopolysiloxane (base polymer) as component (A), the content of the non-functional (that is, free of functional groups capable of participating in hydrosilylation addition reaction between components (A) and (B)) low-molecular-weight siloxane component as described in the BACKGROUND ART section is reduced to or below the predetermined level. Specifically, it is desired that the content of the non-functional low-molecular-weight siloxanes having a DOP of up to 10 as component (F) be 0 to 0.3% by weight, preferably 0 to 0.2% by weight, and more preferably 0 to 0.1% by weight in component (A). If the content of component (F) exceeds 0.3% by weight, its volatilization has adverse impact on the surrounding parts. As used herein, the term "functional group" refers groups which are involved in hydrosilylation addition reaction between components (A) and (B) (i.e., alkenyl and Si—H groups) and Si—OH groups.

Exemplary of component (F) is a diorganocyclopolysiloxane of cyclic structure having the following formula (6), which is free of functional groups (i.e., alkenyl, Si—H and Si—OH groups).

[Chem. 2]

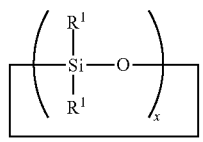

(6)

Herein x is an integer of 3 to 10 and $R^1$ is as defined above.

Means for reducing component (F) may be, for example, by vaporizing and removing the low-molecular-weight siloxane component at a high temperature of about 200 to about 300° C. under a vacuum of 10 to 10,000 Pa, or by further blowing an inert gas during or after the vaporization removal, for thereby promoting vaporization.

Typically, component (E) or (G) to be described below is not present in the alkenyl-containing organopolysiloxane (A) at a level enough to raise substantial problems.

Component (B) is an organohydrogenpolysiloxane containing at least 2 (typically 2 to 300), preferably at least 3 (e.g., 3 to 200), and more preferably about 4 to about 150 silicon-bonded hydrogen atoms (or SiH functional groups) per molecule. Component (B) serves as a curing or cross-linking agent for curing the composition through the cross-linking mechanism that hydrosilylation or addition reaction takes place between SiH functional groups in its molecule and silicon-bonded alkenyl groups in component (A).

The organohydrogenpolysiloxane as component (B) is preferably at least one organohydrogenpolysiloxane having the average compositional formula (7):

$$R^2{}_bH_cSiO_{(4-b-c)/2} \quad (7)$$

wherein $R^2$ is each independently a substituted or unsubstituted, $C_1$-$C_{10}$ monovalent hydrocarbon group, b is a positive number of 0.7 to 2.1, c is a positive number of 0.001 to 0.1, and b+c is 0.8 to 3.0, the organohydrogenpolysiloxane containing at least 2 (typically 2 to 300), preferably at least 3 (e.g., 3 to 200), and more preferably about 4 to about 150 silicon-bonded hydrogen atoms per molecule.

Examples of the monovalent hydrocarbon group represented by $R^2$ are as exemplified above for $R^1$, with alkenyl-free hydrocarbon groups being preferred. The subscript b is a positive number of 0.7 to 2.1, preferably 0.8 to 2.0, c is a positive number of 0.001 to 1.0, preferably 0.01 to 1.0, and b+c is 0.8 to 3.0, preferably 1.0 to 2.5.

More preferred is an organohydrogenpolysiloxane in which the number of silicon atoms per molecule (i.e., DOP) is about 2 to about 300, even more preferably about 3 to about 250, further preferably about 4 to about 200, still further preferably about 5 to about 150, and most preferably about 11 to about 100 and which is liquid at room temperature (25° C.) (typically having a viscosity of the order of 0.1 to 1,000 mPa·s, preferably 0.5 to 500 mPa·s as measured by a rotational viscometer or the like).

The (silicon-bonded) hydrogen atom may be bonded to the silicon atom at the end of the molecular chain and/or a silicon atom midway the molecular chain (i.e., at a non-terminal position).

The molecular structure of the organohydrogenpolysiloxane may be linear, cyclic, branched or three-dimensional network. The organohydrogenpolysiloxane is preferably one or more selected from organohydrogenpolysiloxanes of linear, branched or three dimensional network structure and organohydrogencyclopolysiloxanes (i.e., cyclic polymers consisting of organohydrogensiloxane units). Also, it is preferably one or more selected from organohydrogenpolysiloxanes having a DOP (number of silicon atoms per molecule) of at least 11, and organohydrogenpolysiloxanes having at least 4 SiH functional groups per molecule. Most preferred is one or more selected from organohydrogenpolysiloxanes of linear, cyclic, branched, or three dimensional network structure having a DOP (number of silicon atoms per molecule) of at least 11 and containing at least 4 SiH functional groups per molecule.

Exemplary of the linear organohydrogenpolysiloxane is one having the following formula (5).

[Chem. 3]

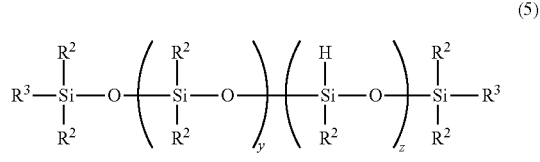

(5)

In formula (5), y is an integer of 1 to 98, z is an integer of 2 to 150 and y+z is an integer of 9 to 300, $R^2$ is as defined above, and $R^3$ is $R^2$ or hydrogen. It is preferred that at least 90% of entire $R^2$ be methyl.

When the organohydrogenpolysiloxane is of cyclic structure, it is preferably an organohydrogencyclopolysiloxane in which all repeating units are organohydrogensiloxane units (e.g., difunctional siloxane units represented by $R^2HSiO_{2/2}$); or when the organohydrogenpolysiloxane is a diorganosiloxane-organohydrogensiloxane cyclic copolymer containing the organohydrogensiloxane units and diorganosiloxane units (e.g., $R^2{}_2SiO_{2/2}$) as some repeating units in the molecule, it is preferably a cyclic high polymer having a DOP (i.e., number of silicon atoms per molecule) of at least 11, or a richly SiH functional cyclic polymer having a number of SiH functional groups per molecule (i.e., number of repeating organohydrogensiloxane units per molecule) which is at least 4.

The ratio of the total number of silicon-bonded hydrogen atoms to the total number of carbon atoms (e.g., total number of carbon atoms in $R^2$) in the molecule is preferably (hydrogen atom)/(carbon atom)<0.6, more preferably 0.05<(hydrogen atom)/(carbon atom)≤0.5, even more preferably 0.1≤(hydrogen atom)/(carbon atom)≤0.4, and most preferably 0.25≤(hydrogen atom)/(carbon atom)≤0.4, as a molar ratio. As long as the ratio is up to 0.6, the density of SiH functional groups is not too high, causing no bubbles. As long as the ratio is at least 0.05, the reaction is not too slow, causing no molding failures.

Examples of the organohydrogenpolysiloxane as component (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane,
both end trimethylsiloxy-blocked methylhydrogenpolysiloxane,
both end trimethylsiloxy-blocked dimethylsiloxane/methylhydrogensiloxane copolymers,
both end dimethylhydrogensiloxy-blocked dimethylpolysiloxane,
both end dimethylhydrogensiloxy-blocked dimethylsiloxane/methylhydrogensiloxane copolymers,
both end trimethylsiloxy-blocked methylhydrogensiloxane/diphenylsiloxane copolymers,
both end trimethylsiloxy-blocked methylhydrogensiloxane/diphenylsiloxane/-dimethylsiloxane copolymers,
both end trimethylsiloxy-blocked methylhydrogensiloxane/methylphenylsiloxane/-dimethylsiloxane copolymers,
both end dimethylhydrogensiloxy-blocked methylhydrogensiloxane/dimethylsiloxane/-diphenylsiloxane copolymers,
both end dimethylhydrogensiloxy-blocked methylhydrogensiloxane/dimethylsiloxane/-methylphenylsiloxane copolymers,
copolymers consisting of $(CH_3)_2HSiO_{1/2}$ units, $(CH_3)_3SiO_{1/2}$ units and $SiO_{4/2}$ units,
copolymers consisting of $(CH_3)_2HSiO_{1/2}$ units and $SiO_{4/2}$ units, copolymers consisting of $(CH_3)_2HSiO_{1/2}$ units, $SiO_{4/2}$ units and $(C_6H_5)_3SiO_{1/2}$ units, and other forms of the foregoing in which some or all methyl groups are substituted by other alkyl groups such as ethyl and propyl or phenyl groups.

The organohydrogenpolysiloxane as component (B) is blended in an amount of 0.3 to 20 parts, preferably 0.5 to 15 parts, and more preferably 0.8 to 10 parts by weight per 100 parts by weight of component (A). If the amount of component (B) is too small, crosslinking points are short (i.e., crosslinking density is low), failing to produce a rubber-like elastomer (cured rubber). If the amount of component (B) is too much, crosslinking points are rather distributed, leading to poor rubber properties.

The molar ratio of silicon-bonded hydrogen atoms (or SiH functional groups) of organopolysiloxanes in component (B) to total silicon-bonded alkenyl groups in component (A), referred to as "SiH/alkenyl ratio", is preferably from 0.6/1 to 3.0/1, more preferably from 0.8/1 to 2.5/1. When the ratio exceeds 0.6, the fully crosslinked rubber is formed. When the ratio is less than 3.0, unreacted SiH functional group-bearing low-molecular-weight siloxanes are not left after curing.

The organohydrogenpolysiloxane as component (B) or crosslinker contains (G) organopolysiloxanes free of Si—OH functional groups, containing at least one silicon-bonded hydrogen (or SiH functional group) per molecule and having a DOP of up to 10 which are derived from the organohydrogenpolysiloxane (B). The organopolysiloxanes (G) include a diorganosiloxane-organohydrogensiloxane cyclic copolymer having a DOP of up to 10, specifically a cyclic organohydrogenpolysiloxane having the following formula (8):

[Chem. 4]

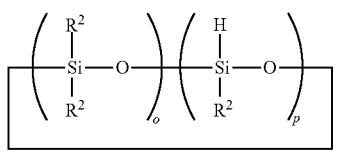

(8)

wherein o is an integer of 1 to 9, p is an integer of 1 to 9, especially 1 to 3, o+p is an integer of 3 to 10, $R^2$ is as defined above, but free of alkenyl, and more specifically a low-molecular-weight cyclic siloxane having a low SiH functional group concentration, i.e., a number of SiH functional groups (p: number of repeating organohydrogensiloxane units per molecule) in the range of 1 to 3 and a DOP (o+p: number of silicon atoms per molecule) of up to 10 and being free of alkenyl and Si—OH groups.

It is desired that the content of component (G) be reduced to 0 to 10.0% by weight, preferably 0 to 8.0% by weight, and more preferably 0 to 5.0% by weight based on the weight of component (B). This is essential to avoid the following problems. If SiH functional low-molecular-weight siloxanes are left in the cured product, they volatilize from the cured product into the atmosphere and deposit on the surroundings, causing various troubles. Also, once the SiH functional low-molecular-weight siloxanes have volatilized into the atmosphere and deposited on the surroundings, they are not readily removable by such means as wiping with a solvent because of SiH functional groups they possess.

Of the SiH-containing low-molecular-weight cyclic siloxanes, some or most crosslinking agents having a high addition reactivity are incorporated in the siloxane matrix of the cured product by rubber crosslinking reaction, whereas low-molecular-weight cyclic siloxanes having a low SiH functional group concentration, as demonstrated by a number of SiH functional groups per molecule (specifically, number of SiH groups with a relatively low addition reactivity in the form of hydrogen atoms bonded to silicon atoms which are located at positions midway the molecular chain (i.e., non-terminal positions), for example, SiH groups in difunctional siloxane units typically represented by $R^2HSiO_{2/2}$ units) which is 1 to 3, containing at least one diorganosiloxane unit such as $R^2{}_2SiO_{2/2}$ unit per molecule, and having a DOP (number of silicon atoms per molecule) of up to 10 are left intact in the cured product in free state as low-molecular-weight siloxanes having an unreacted SiH functional group because of low addition reactivity. When such low-molecular-weight siloxanes volatilize into the atmosphere and deposit on the surrounding parts during the storage or service of the product, there arise many serious problems such as contact fault, adhesion interference, hydrophobic surface, and outer appearance changes. In particular, if the SiH-containing low-molecular-weight cyclic siloxanes are left in component (B) in an amount of more than 10.0% by weight, they can be left in abundance after curing, giving deleterious influences.

The SiH-containing low-molecular-weight siloxanes may be removed by any methods. However, the method of distilling off by high temperature/long term heat treatment as applied to the removal of non-functional low-molecular-weight siloxanes in the prior art is not preferable because the SiH functional group is highly reactive. The removal of the low-molecular-weight siloxanes is preferably conducted at a temperature of up to 210° C., more preferably up to 200° C. If the temperature is higher than 210° C., an apparatus designed not to expose oil to high temperature for a long time, such as a thin film evaporator must be used. When the temperature is not higher than 210° C., the method of promoting volatilization of the low-molecular-weight siloxanes by not only thoroughly stirring in the equipment, but also forcedly blowing (i.e., bubbling) an inert gas is preferable.

For the volatilization of low-molecular-weight siloxanes, the method of volatilizing the siloxanes out of the system by stirring at high temperature under reduced pressure is typical. In this case, volatilization is preferably performed at a temperature of 150 to 210° C. and a reduced pressure of 1,000 to 1 Pa for 10 minutes to 10 hours.

Component (C) is reinforcing silica. Precipitated silica (wet silica) and fumed silica (dry silica) are widely used.

The precipitated silica used herein desirably has a BET specific surface area of at least 100 m²/g (e.g., 100 to 300 m²/g), preferably 120 to 250 m²/g, and more preferably 150 to 220 m²/g. If the specific surface area is less than 100 m²/g, the desired rubber having high tear strength and high elongation may not be obtained.

The precipitated silica used herein preferably has a DBP oil absorption amount of 100 to 250 ml/100 g, more preferably 150 to 220 ml/100 g. If the DBP oil absorption amount is less than the range, sufficient rubber strength may not be achieved. If the DBP oil absorption amount is greater than the range, compression set may be substantially worsened.

The fumed silica used herein desirably has a BET specific surface area of at least 50 m²/g, preferably at least 100 m²/g, more preferably 120 to 350 m²/g, and even more preferably 150 to 320 m²/g. If the specific surface area is too small, the desired rubber having high tear strength and high elongation may not be obtained.

While the precipitated silica and the fumed silica may be used alone or in combination, it is more preferable to use the fumed silica.

Although the finely divided silica may be used as such, it is preferably treated with a surface treating agent for hydrophobizing prior to use or treated by adding a surface treating agent during the step of kneading silica with the organopolysiloxanes as components (A) and/or (B). The surface treating agent used herein may be selected from well-known agents including alkylalkoxysilanes, alkylhydroxysilanes, alkylchlorosilanes, alkylsilazanes, silane coupling agents, low-molecular-weight siloxane polymers, titanate-based treating agents, and fatty acid esters. Of these, alkyldisilazanes are preferred, with hexamethyldisilazanes being more preferred. The surface treating agent may be used alone, and two or more surface treating agents may be used at a time or different times. The amount of the surface treating agent used is typically about 0.5 to about 50 parts, preferably about 1 to about 40 parts, and more preferably about 2 to about 30 parts by weight per 100 parts by weight of the reinforcing silica. As long as the amount of surface treating agent falls within the range, the composition contains neither treating agent nor decomposition products thereof, has fluidity and experiences no viscosity buildup with time. If the amount of the surface treating agent is too large or too small, rubber strength may be lost.

The amount of finely divided silica blended as component (C) is 5 to 80 parts, preferably 10 to 60 parts, and more preferably 20 to 60 parts by weight per 100 parts by weight of components (A) and (B) combined. Less than 5 parts of silica fails to provide satisfactory rubber strength whereas more than 80 parts interferes with compounding operation and also leads to increased compression set.

Component (D) is an addition reaction catalyst, examples of which are well-known platinum group metal based catalysts including platinum based catalysts such as platinum black, platinic chloride, chloroplatinic acid, the reaction product of chloroplatinic acid with monohydric alcohol, complexes of chloroplatinic acid with olefins, complexes of chloroplatinic acid with vinylsiloxanes, and platinum bisacetoacetate, and palladium and rhodium based catalysts. The addition reaction catalyst may be used in a catalytic amount, which is typically about 0.5 to about 1,000 ppm, specifically about 1 to about 500 ppm of platinum group metal based on the total weight of components (A) and (B).

Component (E) is an organopolysiloxane containing at least one Si—OH functional group (silanol group) per molecule and having a DOP of up to 10, which has any one of the average compositional formulae (2) to (4), and is free of alkenyl and SiH groups.

$$M_{2k+1}Q_k OH \quad (2)$$

$$MD_m OH \quad (3)$$

$$HO\text{-}D_n\text{-}OH \quad (4)$$

Herein k is an integer of 0 to 3, m is an integer of 0 to 9, n is an integer of 1 to 10, M is $(CH_3)_3SiO_{1/2}$—, Q is $SiO_{4/2}$, and D is —$(CH_3)_2SiO_{2/2}$— (the same applies hereinafter).

Examples of the organopolysiloxane having formula (2) include $(CH_3)_3Si$—OH, $[(CH_3)_3SiO]_3Si$—OH, $[(CH_3)_3SiO]_3SiO[(CH_3)_3SiO]_2Si$—OH, and $[(CH_3)_3SiO]_3SiO[(CH_3)_3SiO]_2SiO[(CH_3)_3SiO]_2Si$—OH.

Examples of the organopolysiloxane having formula (3) include $(CH_3)_3SiO(CH_3)_2Si$—OH, $(CH_3)_3SiO(CH_3)_2SiO(CH_3)_2Si$—OH, and $(CH_3)_3SiO(CH_3)_2SiO(CH_3)_2SiO(CH_3)_2Si$—OH.

Examples of the organopolysiloxane having formula (4) include $(CH_3)_2Si(OH)_2$ and $(OH)(CH_3)_2SiO(CH_3)_2Si(OH)$.

Additional examples include polysiloxanes having $M_{2n+3}QDQ_n$-H structure such as $[(CH_3)_3SiO]_3SiO(CH_3)_2Si$—OH and $[(CH_3)_3SiO]_3SiO(CH_3)_2SiO[(CH_3)_2SiO]_2Si$—OH and polysiloxanes having $M_{2n+3}QD_n$-H structure such as $[(CH_3)_3\ SiO]_3SiO(CH_3)_2SiO(CH_3)_2Si$—OH, but are not limited thereto.

The content of component (E) is 0.005 to 0.3% by weight, preferably 0.005 to 0.25% by weight, and more preferably 0.005 to 0.20% by weight based on the total weight of the silicone rubber composition. If the content of component (E) exceeds 0.3% by weight, there is a strong possibility that component (E) transfers to the human body from bottle teats and kitchen goods which are made using the composition.

Component (E) is mainly formed during the step of surface hydrophobizing the reinforcing silica as component (C) and left in the system. When the content of component (E) in the reinforcing silica alone is reduced prior to mixing of silica with the polymer as component (A), the step of surface hydrophobizing the reinforcing silica should be followed by such a step as vacuum drying, heat drying or vacuum heat drying. When hydrophobic treatment is achieved by adding a surface treating agent during mixing of silica with the polymer as component (A), the steps of minimizing the amount of the treating agent and letting the treating agent or decomposition products thereof volatilize by vacuum pumping or heating during mixing are effective for reducing the content of component (E).

Besides the above components, optional components may be compounded if necessary as long as the objects of the invention are not impaired. Included are water for surface treatment; fillers such as quartz powder, diatomaceous earth, and calcium carbonate; conductive agents such as carbon black, conductive zinc oxide, and metal powder; hydrosilylation inhibitors such as nitrogen-containing compounds, acetylene compounds, phosphorus compounds, nitrile compounds, carboxylates, tin compounds, mercury compounds, and sulfur compounds; heat resistance enhancers such as iron oxide and cerium oxide; internal mold release agents such as dimethylsilicone oil; adhesion promoters; and thixotropic agents.

The addition-curable silicone rubber composition may be prepared by intimately mixing the above-described components on a typical mixer or milling machine such as a kneader or planetary mixer.

In the invention, the content of low-molecular-weight siloxanes is determined by placing 1 g of a sample in a vial, adding 10 cc of acetone thereto, holding at room temperature (25° C.) for 24 hours, and analyzing the low-molecular-weight siloxanes extracted in acetone using gas chromatograph (FID detector). The silanol-containing low-molecular-weight siloxane, the non-functional low-molecular-weight siloxane and the SiH-containing low-molecular-weight siloxane can be identified and discerned by GC-MS and $^{29}$Si-NMR.

The curing conditions of the inventive addition-curable silicone rubber composition may be similar to those used for well-known addition reaction-curable silicone rubber compositions. Although the composition will fully cure at room temperature, it may be heated if necessary. In the latter case, the composition may be cured by heating at 80 to 250° C., specifically 120 to 220° C. for 3 seconds to 10 minutes, specifically 5 seconds to 3 minutes.

Like the silicone rubber composition prior to curing, the cured product (i.e., silicone rubber) of the silicone rubber composition should preferably contain component (E) in an amount of 0.005 to 0.3% by weight, more preferably 0.005 to 0.2% by weight, and even more preferably 0.005 to 0.1% by weight and components (F) and (G) in a total amount of 0 to 0.3% by weight, more preferably 0 to 0.25% by weight, and even more preferably 0 to 0.2% by weight, based on the entire cured product.

The contents defined above may be achieved by using components (A) and (B) which contain minimal amounts of components (F) and (G) and conducting the above-described treatment of component (E). Additionally, the relevant components may be reduced by exposing the resulting cured product to reduced pressure and/or elevated temperature.

Regarding the weight loss of cured silicone rubber, Chapter 15 Silicone in Recommendations on Food Contact Materials by BfR (Bundesinstitut fur Risikobewertung) prescribes the guideline indicating a weight loss of up to 0.5% by weight upon heating at 200° C./4 hours. The inventive silicone rubber may clear the weight loss of 0.5% by weight by reducing these low-molecular-weight siloxanes.

The cured product of the addition-curable silicone rubber composition contains low-molecular-weight siloxanes, specifically silanol-containing low-molecular-weight siloxane component in an amount of no more than the specific level. This reduces the risk of direct or indirect absorption of low-molecular-weight siloxanes into the human body via water-base liquids from the cured rubber in applications such as bottle teats, gaskets for water plumbing, seal materials for medical instruments, and various kitchen goods and also overcomes the problems such as haze or turbidity evolution, adhesion interference, and hydrophobic surface resulting from the low-molecular-weight siloxanes volatilizing and depositing on the surroundings.

EXAMPLES

Examples and Comparative Examples are given below for illustrating the invention, but the invention is not limited thereto.

In Examples, the content of component (F) in component (A) and the content of component (G) in component (B) are determined by identification and analysis using GC-MS and $^{29}$Si-NMR spectroscopy. The contents of components (F), (G) and (E) in the entire composition and the cured silicone rubber are determined by extraction with acetone, subsequent identification and analysis using GC-MS and $^{29}$Si-NMR spectroscopy, according to the above-described method for measuring a low-molecular-weight siloxane content.

Further, extraction of hydrophilic molecules is carried out by changing the extraction solvent from acetone to ethylene glycol. As a result, less hydrophobic substances are selectively extracted although the detection accuracy is reduced owing to the solvent properties.

[Measurement]

The weight loss upon heating is measured by the following procedure according to Chapter 15 Silicone in Recommendations on Food Contact Materials by BfR (Bundesinstitut fur Risikobewertung).

Two pieces summing to a total weight of about 10 g are cut out of the cured sheet of about 2 mm thick and allowed to stand in a desiccator containing calcium chloride at 20-26° C. for 48 hours. The pieces are taken out, immediately weighed, and placed in an oven at 200° C. After 4 hours, they are taken out of the oven, allowed to cool down in a desiccator for 30 minutes, and weighed. A weight change before and after oven heating is computed.

Reference Example

Low-molecular-weight siloxanes in the vinyl-containing organopolysiloxane as component (A) and in the organohydrogenpolysiloxane as component (B) were reduced as follows.

Low-molecular-weight siloxanes (non-functional low-molecular-weight siloxanes as component (F)) in the vinyl-containing organopolysiloxane as component (A) were reduced by heating a sample at 200° C. for 6 hours under a vacuum of about 100 Pa with stirring to remove low-molecular-weight siloxanes, blowing (i.e., bubbling) nitrogen gas into the sample for 4 hours for continuing removal, and finally heating the sample at 250° C. for 2 hours under a vacuum of up to 50 Pa for further removal.

Low-molecular-weight siloxanes (composed mainly of SiH-containing low-molecular-weight siloxanes as component (G) and non-functional low-molecular-weight siloxanes as component (F)) in the organohydrogenpolysiloxane as component (B) were reduced by heating a sample at 180° C. for 6 hours under a vacuum of about 100 Pa with stirring to remove low-molecular-weight siloxanes, and blowing (i.e., bubbling) nitrogen gas into the sample for 4 hours for continuing removal. Thereafter, the sample (oily organohydrogenpolysiloxane) was flowed over a hot plate at an elevated temperature of 200° C. and a vacuum of up to 20 Pa as a thin film of up to 100 μm thick for thereby reducing the low-molecular-weight siloxanes.

Example 1

Both end dimethylvinylsiloxy-blocked dimethylpolysiloxane (A1) having an average DOP of 500 (component (F) content=0.05 wt %), 65 parts by weight, was mixed with 30 parts by weight of fumed silica having a specific surface area of 200 m$^2$/g (Aerosil 200, Nippon Aerosil Co., Ltd.), 5 parts by weight of hexamethyldisilazane, and 2.0 parts by weight of water at room temperature for 30 minutes. The mixture was heated at 150° C. under a vacuum of about 100 mmHg, stirred at the temperature for 2 hours and further at 180° C. for 1 hour, and cooled, yielding a silicone rubber base.

To 100 parts by weight of the silicone rubber base was added 30 parts by weight of both end dimethylvinylsiloxy-blocked dimethylpolysiloxane (A2) having an average DOP of 250 (component (F) content=0.03 wt %). The mixture was stirred for 30 minutes. To the mixture, 1.6 parts by weight (SiH/alkenyl=1.3) of methylhydrogenpolysiloxane (B1) having SiH functional groups (total 8 SiH groups per molecule) at both ends and side chains (component (G) content=5.9 wt %), represented by the following formula, as crosslinker and 0.05 part by weight of ethynylcyclohexanol as reaction inhibitor were added. The mixture was stirred for 15 minutes, yielding a silicone rubber composition.

[Chem. 5]

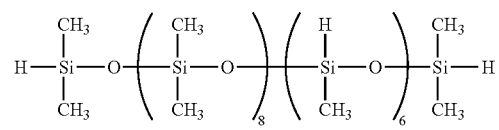

On measurement, the contents of components (E), (G) and (F) in the entire silicone rubber composition were 0.110 wt %, 0.073 wt %, and 0.070 wt %, respectively, and the content of cyclic structures in component (F) was 0.061 wt %. The detail is shown in Table 1, and the results of ethylene glycol extraction shown in Table 2.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.076 wt %, 0.006 wt %, and 0.044 wt %, respectively, and the content of cyclic structures in component (F) was 0.029 wt %. The detail is shown in Table 1, and the results of ethylene glycol extraction shown in Table 2. The cured product showed a weight loss of 0.28% upon 200° C./4 hours heating as measured according to the BfR recommendations.

Example 2

Both end dimethylvinylsiloxy-blocked dimethylpolysiloxane (A1) having an average DOP of 500 in Example 1, 60 parts by weight, was mixed with 40 parts by weight of fumed silica surface-hydrophobized with dimethyldichlorosilane having a specific surface area of 130 m²/g (Aerosil R972, Nippon Aerosil Co., Ltd.), 3 parts by weight of hexamethyldisilazane, 0.2 part by weight of divinyltetramethyldisilazane, and 2.0 parts by weight of water at room temperature for 30 minutes. The mixture was heated at 150° C. under a vacuum of about 200 mmHg, stirred at the temperature for 3 hours and further at 170° C. for 2 hours, and cooled, yielding a silicone rubber base.

To 105 parts by weight of the silicone rubber base were added 20 parts by weight of the above dimethylpolysiloxane (A1) having an average DOP of 500 and 30 parts by weight of both end dimethylvinylsiloxy-blocked dimethylpolysiloxane (A3) containing vinyl groups on side chains and having an average DOP of 180 (vinyl content 0.00052 mol/g, component (F) content=0.04 wt %). The mixture was stirred for 30 minutes. Then, 3.0 parts by weight (SiH/alkenyl=1.8) of methylhydrogenpolysiloxane (B2) containing 20 SiH functional groups on side chains (component (G) content=3.6 wt %), represented by the following formula, as crosslinker and 0.05 part by weight of ethynylcyclohexanol as reaction inhibitor were added. The mixture was stirred for 15 minutes, yielding a silicone rubber composition.

[Chem. 6]

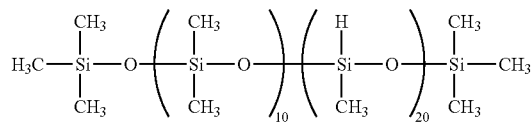

On measurement, the contents of components (E), (G) and (F) in the entire silicone rubber composition were 0.176 wt %, 0.094 wt %, and 0.082 wt %, respectively, and the content of cyclic structures in component (F) was 0.061 wt %.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.135 wt %, 0.015 wt %, and 0.071 wt %, respectively, and the content of cyclic structures in component (F) was 0.042 wt %. The detail is shown in Table 1 and the results of ethylene glycol extraction shown in Table 2. The cured product showed a weight loss of 0.34% upon 200° C./4 hours heating as measured according to the BfR recommendations.

Example 3

Both end dimethylvinylsiloxy-blocked dimethylpolysiloxane (A4) having an average DOP of 450 (component (F) content=0.54 wt %), 70 parts by weight, was mixed with 30 parts by weight of fumed silica having a specific surface area of 300 m²/g (Aerosil 200, Nippon Aerosil Co., Ltd.), 6 parts by weight of hexamethyldisilazane, and 2.0 parts by weight of water at room temperature for 30 minutes. The mixture was heated at 150° C. under a vacuum of about 100 mmHg, stirred at the temperature for 2 hours and further at 180° C. for 2 hours, and cooled, yielding a silicone rubber base.

To 108 parts by weight of the silicone rubber base was added 30 parts by weight of both end dimethylvinylsiloxy-blocked dimethylpolysiloxane (A2) having an average DOP of 250 in Example 1. The mixture was stirred for 30 minutes. Then, 2.0 parts by weight (SiH/alkenyl=1.5) of methylhydrogenpolysiloxane (B3) containing 35 SiH functional groups on side chains (component (G) content=1.8 wt %), represented by the following formula, as crosslinker and 0.05 part by weight of ethynylcyclohexanol as reaction inhibitor were added. The mixture was kneaded for 15 minutes on a twin-roll mill, yielding a silicone rubber composition.

[Chem. 7]

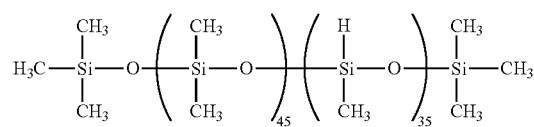

On measurement, the contents of components (E), (G) and (F) in the entire silicone rubber composition were 0.188 wt %, 0.039 wt %, and 0.344 wt %, respectively, and the content of cyclic structures in component (F) was 0.328 wt %.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.129 wt %, 0.003 wt %, and 0.315 wt %, respectively, and the content of cyclic structures in component (F) was 0.298 wt %. The detail is shown in Table 1 and the results of ethylene glycol extraction shown in Table 2. The cured product showed a weight loss of 0.32% upon 200° C./4 hours heating as measured according to the BfR recommendations.

Example 4

Both end dimethylvinylsiloxy-blocked dimethylpolysiloxane (A1) having an average DOP of 500 in Example 1, 65 parts by weight, was mixed with 30 parts by weight of fumed silica having a specific surface area of 200 m²/g (Aerosil 200, Nippon Aerosil Co., Ltd.), 5 parts by weight of hexamethyldisilazane, and 2.0 parts by weight of water at room temperature for 30 minutes. The mixture was heated at 150° C. under a vacuum of about 100 mmHg, stirred at the temperature for 2 hours and further at 180° C. for 1 hour, and cooled, yielding a silicone rubber base.

To 100 parts by weight of the silicone rubber base were added 15 parts by weight of both end dimethylvinylsiloxy-blocked dimethylpolysiloxane (A2) having an average DOP of 250 and 15 parts by weight of both end dimethylvinyl-siloxy-blocked dimethylpolysiloxane (A3) containing vinyl groups on side chains and having an average DOP of 180 in Example 2. The mixture was stirred for 30 minutes. Then, 4.1 parts by weight (SiH/alkenyl=2.3) of methylhydrogenpolysiloxane (B4) containing SiH functional groups (total 4 SiH groups per molecule) at both ends and side chains (component (G) content=60.0 wt %), represented by the following formula, as crosslinker and 0.05 part by weight of ethynylcyclohexanol as reaction inhibitor were added. The mixture was stirred for 15 minutes, yielding a silicone rubber composition.

[Chem. 8]

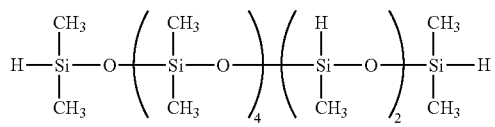

On measurement, the contents of components (E), (G) and (F) in the entire silicone rubber composition were 0.088 wt %, 1.759 wt %, and 0.054 wt %, respectively, and the content of cyclic structures in component (F) was 0.402 wt %.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.073 wt %, 0.048 wt %, and 0.035 wt %, respectively, and the content of cyclic structures in component (F) was 0.027 wt %. The detail is shown in Table 1 and the results of ethylene glycol extraction shown in Table 2. The cured product showed a weight loss of 0.29% upon 200° C./4 hours heating as measured according to the BfR recommendations.

Comparative Example 1

Both end dimethylvinylsiloxy-blocked dimethylpolysiloxane (A1) having an average DOP of 500 in Example 1, 65 parts by weight, was mixed with 30 parts by weight of fumed silica having a specific surface area of 200 m²/g (Aerosil 200, Nippon Aerosil Co., Ltd.), 6 parts by weight of hexamethyldisilazane, and 2.0 parts by weight of water at room temperature for 30 minutes. The mixture was heated at 150° C. under atmospheric pressure, stirred for 3 hours, and cooled, yielding a silicone rubber base.

To 100 parts by weight of the silicone rubber base was added 30 parts by weight of both end dimethylvinylsiloxy-blocked dimethylpolysiloxane (A2) having an average DOP of 250 in Example 1. The mixture was stirred for 30 minutes. Then, 1.6 parts by weight (SiH/alkenyl=1.3) of methylhydrogenpolysiloxane (B1) containing SiH functional groups (total 8 SiH groups per molecule) at both ends and side chains in Example 1, represented by the following formula, as crosslinker and 0.05 part by weight of ethynylcyclohexanol as reaction inhibitor were added. The mixture was stirred for 15 minutes, yielding a silicone rubber composition.

[Chem. 9]

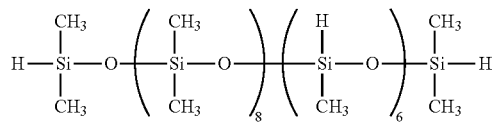

On measurement, the contents of components (E), (G) and (F) in the entire silicone rubber composition were 0.379 wt %, 0.082 wt %, and 0.092 wt %, respectively, and the content of cyclic structures in component (F) was 0.041 wt %.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.281 wt %, 0.007 wt %, and 0.070 wt %, respectively, and the content of cyclic structures in component (F) was 0.030 wt %. The detail is shown in Table 1 and the results of ethylene glycol extraction shown in Table 2. The cured product showed a weight loss of 0.52% upon 200° C./4 hours heating as measured according to the BfR recommendations.

Comparative Example 2

Both end dimethylvinylsiloxy-blocked dimethylpolysiloxane (A1) having an average DOP of 500 in Example 1, 60 parts by weight, was mixed with 40 parts by weight of fumed silica surface-hydrobized with dimetyldichlorosilane having a specific surface area of 130 m²/g (Aerosil R972, Nippon Aerosil Co., Ltd.), 5 parts by weight of hexamethyldisilazane, 0.2 part by weight of divinyltetramethyldisilazane, and 2.0 parts by weight of water at room temperature for 30 minutes. The mixture was heated at 130° C. under atmospheric pressure, stirred for 3 hours, and cooled, yielding a silicone rubber base.

To 105 parts by weight of the silicone rubber base were added 20 parts by weight of the above dimethylpolysiloxane (A1) having an average DOP of 500 and 30 parts by weight of both end dimethylvinylsiloxy-blocked dimethylpolysiloxane (A3) containing vinyl groups on side chains and having an average DOP of 180. The mixture was stirred for 30 minutes. Then, 3.0 parts by weight (SiH/alkenyl=1.8) of methylhydrogenpolysiloxane (B2) containing 20 SiH functional groups on side chains, represented by the following formula, as crosslinker and 0.05 part by weight of ethynylcyclohexanol as reaction inhibitor were added. The mixture was stirred for 15 minutes, yielding a silicone rubber composition.

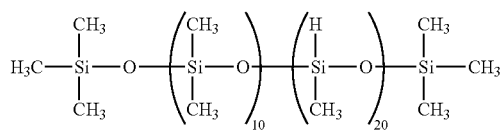

On measurement, the contents of components (E), (G) and (F) in the entire silicone rubber composition were 0.534 wt %, 0.102 wt %, and 0.173 wt %, respectively, and the content of cyclic structures in component (F) was 0.072 wt %.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.377 wt %, 0.018 wt %, and 0.127 wt %, respectively, and the content of cyclic structures in component (F) was 0.055 wt %. The detail is shown in Table 1 and the results of ethylene glycol extraction shown in Table 2. The cured product showed a weight loss of 0.63% upon 200° C./4 hours heating as measured according to the BfR recommendations.

Comparative Example 3

Both end dimethylvinylsiloxy-blocked dimethylpolysiloxane (A4) having an average DOP of 450, 70 parts by weight, was mixed with 30 parts by weight of fumed silica having a specific surface area of 300 m²/g (Aerosil 200, Nippon Aerosil Co., Ltd.), 8 parts by weight of hexamethyldisilazane, and 2.0 parts by weight of water at room temperature for 30 minutes. The mixture was heated at 150° C. under atmospheric pressure, stirred for 4 hours, and cooled, yielding a silicone rubber base.

To 108 parts by weight of the silicone rubber base was added 30 parts by weight of both end dimethylvinylsiloxy-blocked dimethylpolysiloxane (A2) having an average DOP of 250 in Example 1. The mixture was stirred for 30 minutes. Then, 2.0 parts by weight (SiH/alkenyl=1.5) of methylhydrogenpolysiloxane (B3) containing 35 SiH functional groups on side chains, represented by the following formula, as crosslinker and 0.05 part by weight of ethynylcyclohexanol as reaction inhibitor were added. The mixture was kneaded for 15 minutes on a twin-roll mill, yielding a silicone rubber composition.

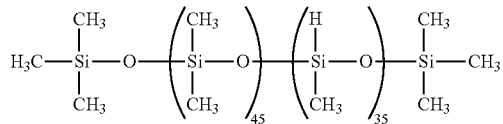

On measurement, the contents of components (E), (G) and (F) in the entire silicone rubber composition were 0.523 wt %, 0.042 wt %, and 0.504 wt %, respectively, and the content of cyclic structures in component (F) was 0.418 wt %.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.370 wt %, 0.003 wt %, and 0.430 wt %, respectively, and the content of cyclic structures in component (F) was 0.338 wt %. The detail is shown in Table 1 and the results of ethylene glycol extraction shown in Table 2. The cured product showed a weight loss of 0.98% upon 200° C./4 hours heating as measured according to the BfR recommendations.

Comparative Example 4

Both end dimethylvinylsiloxy-blocked dimethylpolysiloxane (A1) having an average DOP of 500 in Example 1, 65 parts by weight, was mixed with 30 parts by weight of fumed silica having a specific surface area of 200 m²/g (Aerosil 200, Nippon Aerosil Co., Ltd.), 6 parts by weight of hexamethyldisilazane, and 2.0 parts by weight of water at room temperature for 30 minutes. The mixture was heated at 150° C. under atmospheric pressure, stirred for 3 hours, and cooled, yielding a silicone rubber base.

To 100 parts by weight of the silicone rubber base were added 15 parts by weight of both end dimethylvinylsiloxy-blocked dimethylpolysiloxane (A2) having an average DOP of 250 and 15 parts by weight of both end dimethylvinylsiloxy-blocked dimethylpolysiloxane (A3) containing vinyl groups on side chains and having an average DOP of 180 in Example 2. The mixture was stirred for 30 minutes. Then, 4.1 parts by weight (SiH/alkenyl=2.3) of methylhydrogenpolysiloxane (B4) containing SiH functional groups (total 4 SiH groups per molecule) at both ends and side chains, represented by the following formula, as crosslinker and 0.05 part by weight of ethynylcyclohexanol as reaction inhibitor were added. The mixture was stirred for 15 minutes, yielding a silicone rubber composition.

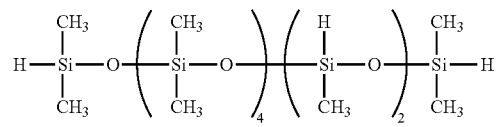

On measurement, the contents of components (E), (G) and (F) in the entire silicone rubber composition were 0.702 wt %, 1.783 wt %, and 0.104 wt %, respectively, and the content of cyclic structures in component (F) was 0.038 wt %.

The silicone rubber composition was mixed with 0.1 part by weight of a platinum catalyst (Pt concentration 1 wt %) and press cured at 120° C./10 minutes to form a rubber sheet of 2 mm thick. The content of low-molecular-weight siloxanes having a DOP of up to 10 was measured by extraction from the rubber sheet with acetone (25° C./24 hours immersion), with the results shown in Table 1. On measurement, the contents of components (E), (G) and (F) were 0.410 wt %, 0.046 wt %, and 0.095 wt %, respectively, and the content of cyclic structures in component (F) was 0.029 wt %. The detail is shown in Table 1 and the results of ethylene glycol extraction shown in Table 2. The cured product showed a weight loss of 0.77% upon 200° C./4 hours heating as measured according to the BfR recommendations.

TABLE 1

| | | Example | | | | Comparative Example | | | |
|---|---|---|---|---|---|---|---|---|---|
| | | 1 | 2 | 3 | 4 | 1 | 2 | 3 | 4 |
| Component (E) | M-OH | 0.008 | 0.005 | 0.004 | 0.006 | 0.015 | 0.018 | 0.015 | 0.012 |
| | M3Q-OH | 0.031 | 0.061 | 0.058 | 0.037 | 0.123 | 0.149 | 0.152 | 0.165 |
| | M5Q2-OH | 0.022 | 0.039 | 0.039 | 0.019 | 0.091 | 0.128 | 0.108 | 0.128 |
| | M5Q3-OH | 0.015 | 0.030 | 0.028 | 0.011 | 0.052 | 0.082 | 0.095 | 0.105 |
| | Total (%) | 0.076 | 0.135 | 0.129 | 0.073 | 0.281 | 0.377 | 0.370 | 0.410 |
| Component (G) | D3DH | 0.001 | 0.004 | 0.000 | 0.012 | 0.002 | 0.004 | 0.001 | 0.013 |
| | D4DH | 0.003 | 0.005 | 0.001 | 0.019 | 0.003 | 0.006 | 0.001 | 0.020 |
| | D5DH | 0.002 | 0.004 | 0.002 | 0.013 | 0.002 | 0.004 | 0.001 | 0.009 |
| | D6DH | 0.000 | 0.002 | 0.000 | 0.003 | 0.000 | 0.003 | 0.000 | 0.003 |
| | D7DH | 0.000 | 0.000 | 0.000 | 0.001 | 0.000 | 0.001 | 0.000 | 0.001 |
| | Total (%) | 0.006 | 0.015 | 0.003 | 0.048 | 0.007 | 0.018 | 0.003 | 0.046 |
| Component (F) | D4 | 0.004 | 0.005 | 0.036 | 0.003 | 0.006 | 0.007 | 0.038 | 0.004 |
| | D5 | 0.002 | 0.007 | 0.048 | 0.003 | 0.003 | 0.008 | 0.051 | 0.004 |
| | M4Q | 0.003 | 0.005 | 0.007 | 0.005 | 0.010 | 0.032 | 0.028 | 0.019 |
| | D6 | 0.005 | 0.007 | 0.051 | 0.006 | 0.005 | 0.009 | 0.060 | 0.006 |
| | D7 | 0.006 | 0.008 | 0.045 | 0.006 | 0.005 | 0.008 | 0.058 | 0.007 |
| | M6Q2 | 0.001 | 0.002 | 0.002 | 0.000 | 0.012 | 0.019 | 0.031 | 0.020 |
| | D8 | 0.005 | 0.008 | 0.043 | 0.004 | 0.004 | 0.008 | 0.049 | 0.003 |
| | M6Q3 | 0.011 | 0.013 | 0.008 | 0.003 | 0.018 | 0.021 | 0.033 | 0.027 |
| | D9 | 0.003 | 0.007 | 0.039 | 0.002 | 0.003 | 0.006 | 0.042 | 0.003 |
| | D10 | 0.004 | 0.009 | 0.036 | 0.003 | 0.004 | 0.009 | 0.040 | 0.002 |
| | Total (%) | 0.044 | 0.071 | 0.315 | 0.035 | 0.070 | 0.127 | 0.430 | 0.095 |

TABLE 2

| | | Example | | | | Comparative Example | | | |
|---|---|---|---|---|---|---|---|---|---|
| | | 1 | 2 | 3 | 4 | 1 | 2 | 3 | 4 |
| Component (E) | M-OH | 0.003 | 0.002 | 0.003 | 0.002 | 0.009 | 0.011 | 0.010 | 0.008 |
| | M3Q-OH | 0.007 | 0.009 | 0.011 | 0.008 | 0.025 | 0.019 | 0.028 | 0.030 |
| | Total (%) | 0.01 | 0.011 | 0.014 | 0.01 | 0.034 | 0.03 | 0.038 | 0.038 |

The invention claimed is:

1. An addition-curable silicone rubber composition comprising:
   (A) 100 parts by weight of an organopolysiloxane having at least two silicon-bonded alkenyl groups per molecule, represented by the average compositional formula (1):

$$R^1_a SiO_{(4-a)/2} \quad (1)$$

wherein $R^1$ which may be the same or different is a monovalent hydrocarbon group and a is a positive number of 1.5 to 2.8,
   (B) 0.3 to 20 parts by weight of a linear organohydrogenpolysiloxane having the following formula (5):

[Chem. 1]

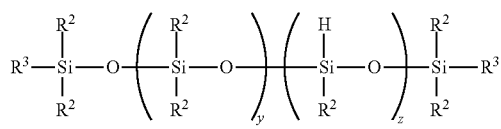

(5)

wherein y is an integer of 1 to 98, z is an integer of 2 to 50, y+z is an integer of 9 to 100, $R^2$ which may be the same or different is a substituted or unsubstituted, $C_1$-$C_{10}$ monovalent hydrocarbon group, and $R^3$ is each independently $R^2$ or hydrogen,
   (C) 5 to 80 parts by weight of reinforcing silica,
   (D) an addition reaction catalyst in an amount to give 0.5 to 1,000 ppm of platinum group metal based on the total weight of components (A) and (B), and
   (E) an organopolysiloxane containing at least one Si—OH functional group per molecule and having a degree of polymerization of up to 10 is present in a content of 0.005 to 0.3% by weight based on the total weight of the composition.

2. The silicone rubber composition of claim 1 wherein a molar ratio of SiH functional groups in component (B) to silicon-bonded alkenyl groups in component (A), that is, SiH/alkenyl ratio is in a range of 0.6/1 to 3.0/1.

3. The silicone rubber composition of claim 1 or 2 wherein the reinforcing silica as component (C) is silica which is hydrophobically surface treated with at least one surface treating agent selected from organosilane and organosilazane compounds.

4. The silicone rubber composition of claim 3 wherein the surface treating agent is hexamethyldisilazane.

5. The silicone rubber composition of claim 1 wherein component (E) is at least one organopolysiloxane selected from those of structures having the following formulae (2) to (4):

$$M_{2k+1}Q_kOH \quad (2)$$

$$MD_mOH \quad (3)$$

$$HO\text{-}D_n\text{-}OH \quad (4)$$

wherein k is an integer of 0 to 3, m is an integer of 0 to 9, n is an integer of 1 to 10, M is $(CH_3)_3SiO_{1/2}$—, Q is $SiO_{4/2}$, and D is —$(CH_3)_2SiO_{2/2}$—.

6. The silicone rubber composition of claim 1, further comprising (F) an organopolysiloxane free of a functional group in the molecule and having a degree of polymerization of up to 10 in a content of up to 0.3% by weight based on component (A).

7. The silicone rubber composition of claim 1, further comprising (G) an organopolysiloxane free of a Si—OH functional group in the molecule, containing at least one SiH functional group per molecule and having a degree of polymerization of up to 10 in a content of up to 10.0% by weight based on component (B).

8. The silicone rubber composition of claim 1, further comprising
(F) an organopolysiloxane free of a functional group in the molecule and having a degree of polymerization of up to 10 in a content of up to 0.3% by weight based on component (A), and
(G) an organopolysiloxane free of a Si—OH functional group in the molecule, containing at least one SiH functional group per molecule and having a degree of polymerization of up to 10 in a content of up to 10.0% by weight based on component (B),
wherein components (F) and (G) are present in a total content of up to 0.3% by weight based on the total weight of the composition.

9. A silicone rubber which is a cured product of the silicone rubber composition of claim 1.

10. The silicone rubber of claim 9 wherein component (E) is present in a content of 0.005 to 0.3% by weight in the cured product of the silicone rubber composition.

11. The silicone rubber of claim 10 wherein components (F) and (G) are present in a total content of up to 0.3% by weight in the cured product of the silicone rubber composition.

12. The silicone rubber of claim 9, 10 or 11 wherein the silicone rubber composition is cured into a product which shows a weight loss of up to 0.5% by weight upon heating at 200° C. for 4 hours according to the BfR recommendations.

13. The silicone rubber composition of claim 1, wherein component (E) is present in a content of 0.005 to 0.1% by weight in the cured product of the silicone rubber composition.

* * * * *